United States Patent
Krommenhoek et al.

(10) Patent No.: US 10,337,938 B2
(45) Date of Patent: Jul. 2, 2019

(54) DUAL OUTPUT PRESSURE SENSOR WITH SINGLE PRESSURE TRANSDUCER ELEMENT

(71) Applicant: Sensata Technologies, Inc., Attleboro, MA (US)

(72) Inventors: Erik Krommenhoek, Enschede (NL); Arnout van den Bos, Deurningen (NL)

(73) Assignee: Sensata Technologies, Inc., Attleboro, MA (US)

( * ) Notice: Subject to any disclaimer, the term of this patent is extended or adjusted under 35 U.S.C. 154(b) by 183 days.

(21) Appl. No.: 15/434,501

(22) Filed: Feb. 16, 2017

(65) Prior Publication Data
US 2018/0231429 A1 Aug. 16, 2018

(51) Int. Cl.
G01L 19/08 (2006.01)
G01L 9/00 (2006.01)

(52) U.S. Cl.
CPC .......... G01L 19/083 (2013.01); G01L 9/0041 (2013.01)

(58) Field of Classification Search
None
See application file for complete search history.

(56) References Cited

U.S. PATENT DOCUMENTS 3,484,732 A * 12/1969 Postma ................. G01L 1/2218
338/4
4,574,640 A * 3/1986 Krechmery ........... G01L 9/0052
338/4
7,759,945 B2 * 7/2010 Wade .................... G01D 3/024
324/605
7,950,286 B2 * 5/2011 Bentley .................. G01L 19/02
73/753
2009/0049887 A1 2/2009 Wade
(Continued)

FOREIGN PATENT DOCUMENTS

EP 2256466 A2 1/2010
EP 2199770 A2 6/2010
(Continued)

OTHER PUBLICATIONS

Combined Search and Examination Report under Sections 17 and 18(3) from related GB Application No. GB1717946.6, dated Apr. 23, 2018.

*Primary Examiner* — Andre J Allen
(74) *Attorney, Agent, or Firm* — Burns & Levinson, LLP; Joseph M. Maraia

(57) ABSTRACT

A dual range sensor apparatus includes a single pressure transducer element coupled to respective inputs of two discrete signal conditioning modules, or to both inputs of a multiple input signal conditioning module that is configured to condition the output signal of two transducer elements. The disclosed sensor apparatus outputs a pressure signal in a limited pressure range with very high accuracy, and also provides a pressure signal in a wider pressure range with the same accuracy that can be achieved with traditional pressure sensor configurations. The sensor apparatus may provide output on a single output node in a multiplexed output signal format. The multiplexed output signal format may include several digital output formats and may be provided on a single output pin of the sensor apparatus.

7 Claims, 7 Drawing Sheets

(56) References Cited

U.S. PATENT DOCUMENTS

| | | | |
|---|---|---|---|
| 2010/0154551 A1* | 6/2010 | Bentley | G01L 9/06 73/714 |
| 2011/0179879 A1* | 7/2011 | Bentley | G01L 9/06 73/753 |
| 2015/0107367 A1* | 4/2015 | Kosberg | B81B 7/008 73/754 |

FOREIGN PATENT DOCUMENTS

| | | |
|---|---|---|
| JP | 2006090789 | 4/2006 |
| WO | 9820615 A2 | 5/1998 |

* cited by examiner

DUAL OUTPUT PRESSURE SENSOR WITH SINGLE PRESSURE TRANSDUCER ELEMENT

FIELD OF TECHNOLOGY

The present disclosure relates to the field of sensors and more particularly to the field of dual range pressure sensors.

BACKGROUND

In certain mechanical systems it is desirable to accurately and rapidly sense the pressure of a medium in a first pressure range and a second pressure range at the same location.

Traditionally, pressure sensors generally include a single pressure transducer element such as a diaphragm type pressure transducer or a piezo-electric pressure transducer coupled to a signal conditioning module. The pressure transducer element creates an output signal proportional to a pressure applied to a pressure sensitive membrane of the pressure transducer element. The signal conditioning module linearizes, amplifies and/or filters an output voltage of the pressure transducer to generate a sensor output signal. Traditional signal conditioning modules convert the pressure transducer output signal into a sensor output signal ranging from a low state at minimum pressure considered ($P_{min}$) to a high state at a maximum pressure considered ($P_{max}$). The pressure range of the sensor is defined as $P_{max}-P_{min}$.

A maximum output error of the sensor signal at a defined applied pressure typically increases when the pressure range of the sensor is increased. This can be related to pressure non-linearity errors, the calibration pressure set point distribution and bit resolution in digital signal paths, for example.

SUMMARY

A sensor apparatus according to the present disclosure includes a single pressure transducer element coupled to respective inputs of two discrete signal conditioning modules, or to both inputs of a multiple input signal conditioning module that is configured to condition the two transducer element output signals.

Embodiments of the sensor apparatus according to aspects of the present disclosure may be used with multiple sensor types, including differential pressure sensors for monitoring particle filters on combustion engines, for example.

In a combustion engine particle filter application, the pressure drop across a clean filter at mild driving conditions is very low. Under these conditions high accuracy is needed in the low end of a small pressure range to ensure that on board diagnostics (OBD) requirements are fulfilled. A much greater pressure drop across the filter may occur when the filter is loaded and the engine runs at full load. Under these conditions the pressure sensor apparatus measures pressure at the high end of a wider pressure range in order to detect situations in which a pressure drop across the filter is excessive. Conditions of excessive pressure may indicate that the engine power should be reduced to avoid risks of fire, filter damage or engine damage, for example.

The disclosed pressure sensor apparatus is capable of operating in the narrow low pressure range and also in a wider pressure range using a single sensing transducer without making compromises in either accuracy or range. For example, the disclosed sensor apparatus outputs a pressure signal in a limited pressure range with very high accuracy, while at the same time provides a pressure signal in a wider pressure range with the same accuracy that can be achieved with traditional pressure sensor configurations.

The disclosed sensor apparatus is significantly lower in cost compared to dedicated low range and high range pressure sensors because it needs only a single pressure connection. This reduces tubing complexity and cost, for example.

Embodiments of the disclosed sensor apparatus may provide output on a single output node in a multiplexed output signal format. The multiplexed output signal format may include several digital output formats and may be provided on a single output pin of the sensor apparatus. This further reduces cost of implementing the sensor apparatus by reducing the cost of wiring, for example.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
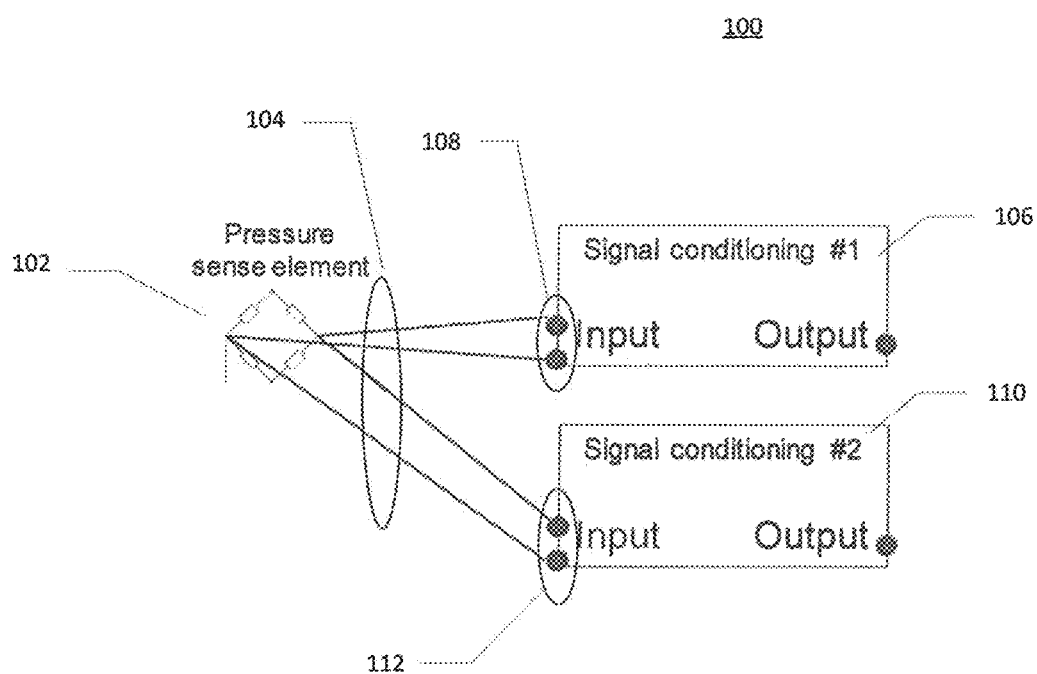
FIG. 1 is a block diagram illustrating an example embodiment of a pressure sensing apparatus according to an aspect of the present disclosure.

A pressure sensor apparatus according to an aspect of the present disclosure is described with reference to FIG. 1. The pressure sensor apparatus 100 includes a first pressure transducer element 102 including a first output path 104. A first signal conditioning circuit 106 including a first input path 108 is coupled to the first output path 104 of the first pressure transducer element 102. A second signal conditioning circuit 110 including a second input path 112 is also coupled to the first output path 104 of the first pressure transducer element 102. According to an aspect of the present disclosure, the first signal conditioning circuit 106 is configured based on a first pressure range and the second signal conditioning circuit 110 is configured based on a second pressure range.

An output of the first signal conditioning circuit 106 represents pressure measured by the first pressure transducer element 102 in the first pressure range, and an output of the second signal conditioning circuit 110 represents pressure measured by the first pressure transducer element 102 in the second pressure range.

An illustrative embodiment of the disclosed pressure sensor apparatus 100 includes digital circuitry configured to generate a digital output representing the output of the first signal conditioning circuit 106 and/or the output of the second signal conditioning circuit 110. The digital circuitry may be separate from or incorporated with the first signal conditioning circuit 106 and/or the first signal conditioning circuit 110.

In this illustrative embodiment the digital output may be a digital a message including a first measurement based on the output of the first signal conditioning circuit 106 and including a second measurement based on the output of the second signal conditioning circuit 110.

Figure 2:
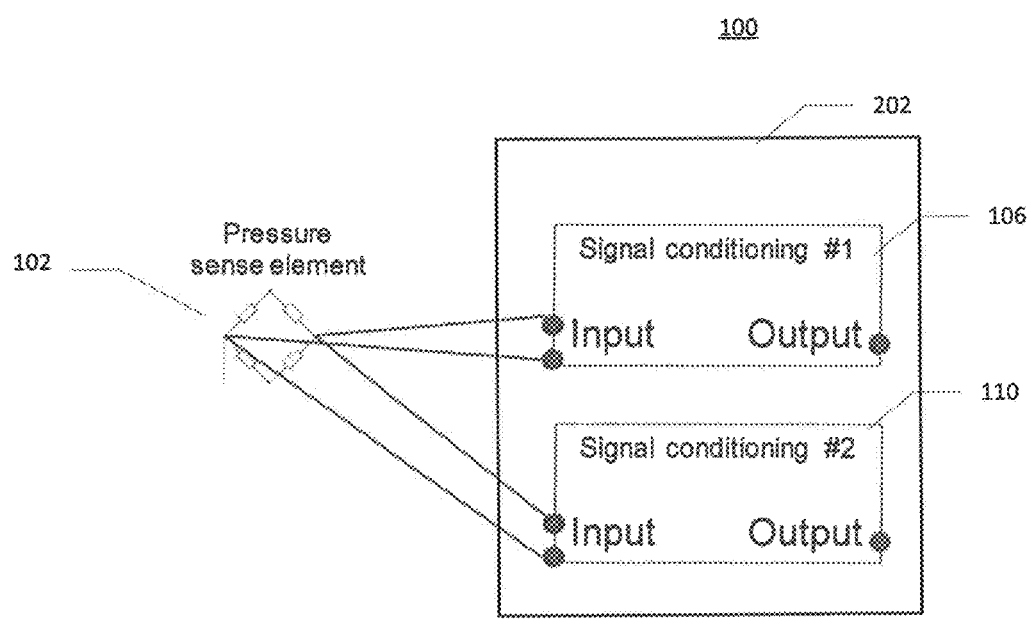
FIG. 2 is a block diagram illustrating an example embodiment of a pressure sensing apparatus according to another aspect of the present disclosure.

Referring to FIG. 2, the pressure sensor apparatus 100 may include an application specific integrated circuit (ASIC) package 202 coupled to the first pressure transducer element 102, wherein the ASIC package includes the first signal conditioning circuit 106, the second signal conditioning circuit 110 and the digital circuitry.

In another illustrative embodiment, the pressure sensor apparatus 100 may include analog circuitry configured to generate a first analog output representing the output of the first signal conditioning circuit 106 and a second analog output representing the output of the second signal conditioning circuit 110. The analog circuitry may be separate from or incorporated with the first signal conditioning circuit 106 and/or the second signal conditioning circuit 110.

In this illustrative embodiment, the application specific integrated circuit (ASIC) package 202 coupled to the first pressure transducer element 102 includes the first signal conditioning circuit 106, the second signal conditioning circuit 110 and the analog circuitry.

According to another aspect of the present disclosure, the pressure sensor apparatus 100 may include first analog circuitry configured to generate a first analog output representing the output of the first signal conditioning circuit 106, and second analog circuitry configured to generate a second analog output representing the output of the second signal conditioning circuit 110. The first analog circuitry be separate from or incorporated with the first signal conditioning circuit 106. The second analog circuitry may be separate from or incorporated with the second signal conditioning circuit 110.

Figure 3:
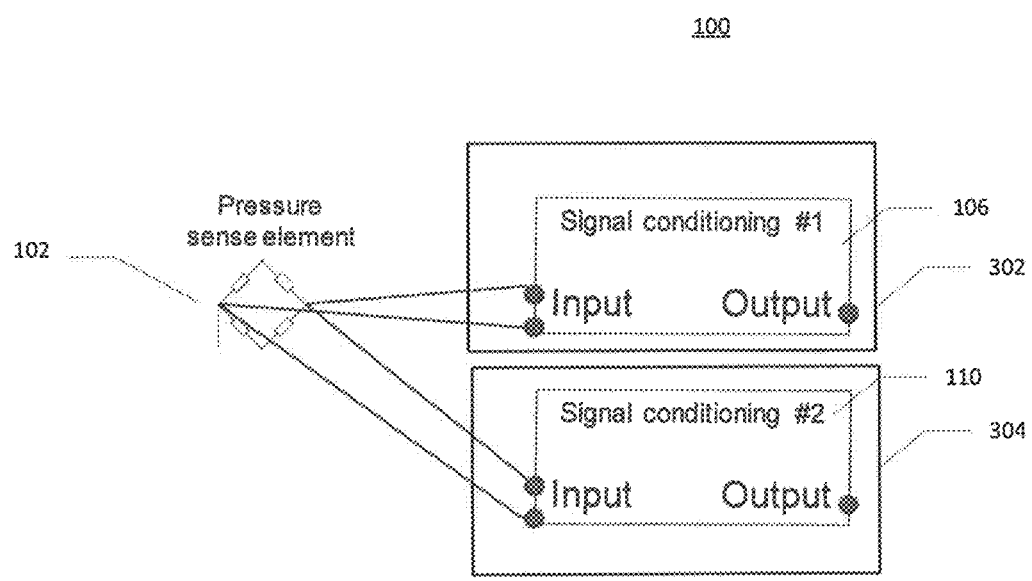
FIG. 3 is a block diagram illustrating an example embodiment of a pressure sensing apparatus according to another aspect of the present disclosure.

Referring to FIG. 3, in an illustrative embodiment, the apparatus 100 according to this aspect of the disclosure may include a first application specific integrated circuit (ASIC) package 302 coupled to the first pressure transducer element 102, wherein the first ASIC package includes the first signal conditioning circuit 106 and the first analog circuitry, and a second ASIC package 304 coupled to the first pressure transducer element 102, wherein the second ASIC package includes the second signal conditioning circuit 110 and the second analog circuitry.

Figure 4:
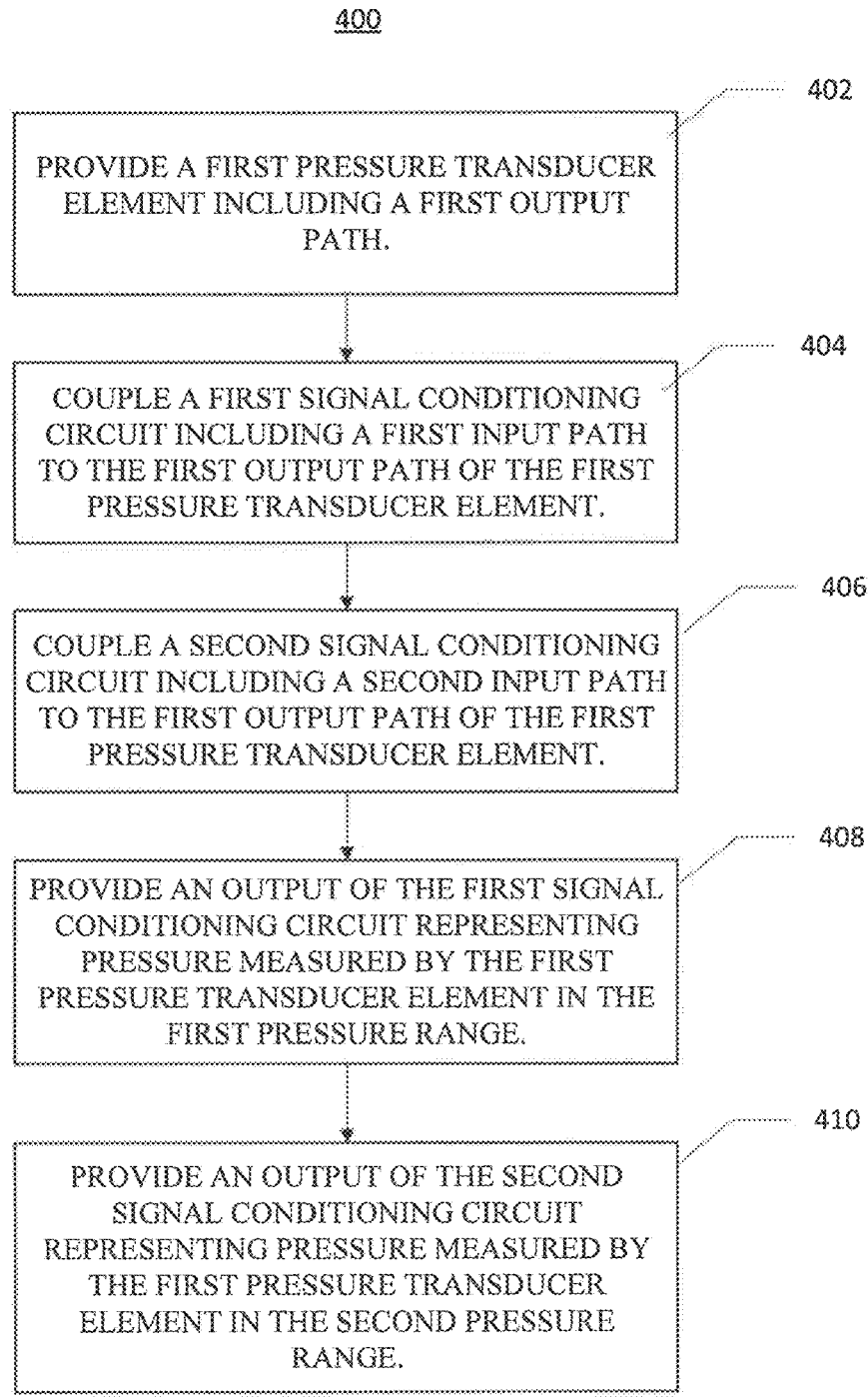
FIG. 4 is a process flow diagram illustrating a method for providing a pressure measurement according to an aspect of the present disclosure.

Another aspect of the present disclosure includes a method of providing a pressure measurement. Referring to FIG. 4, the method 400 includes providing a first pressure transducer element including a first output path at block 402, coupling a first signal conditioning circuit including a first input path to the first output path of the first pressure transducer element at block 404 and coupling a second signal conditioning circuit including a second input path to the first output path of the first pressure transducer element at block 406. According to the method, 400, the first signal conditioning circuit is configured based on a first pressure range, and wherein the second signal conditioning circuit is configured based on a second pressure range.

The method may also include providing an output of the first signal conditioning circuit representing pressure measured by the first pressure transducer element in the first pressure range at block 408, and providing an output of the second signal conditioning circuit representing pressure measured by the first pressure transducer element in the second pressure range at block 410.

Figure 5:
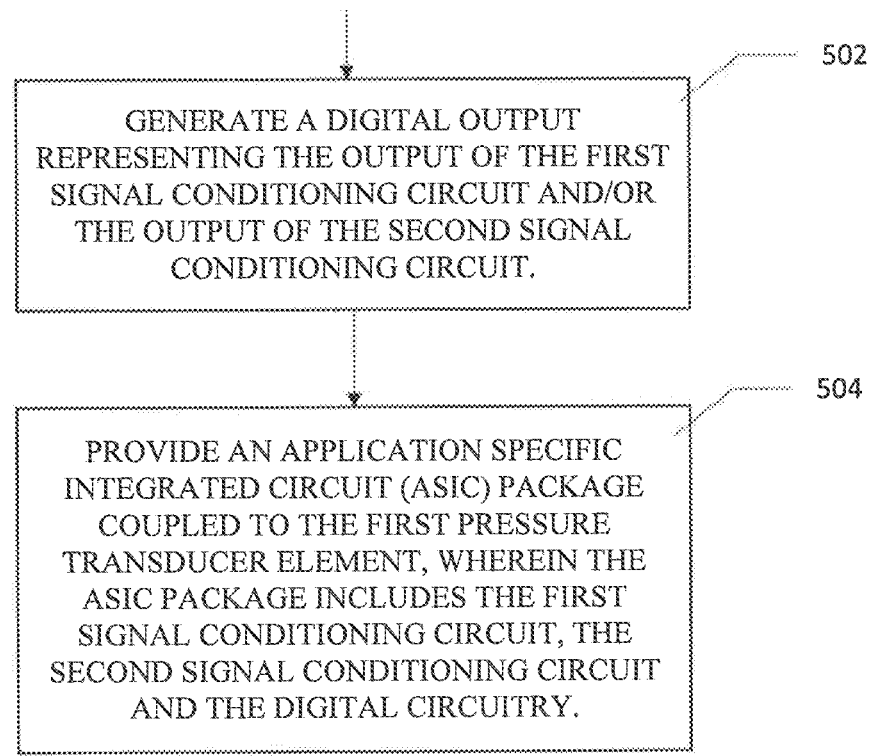
FIG. 5 is a process flow diagram illustrating a method for providing a pressure measurement according to an aspect of the present disclosure.

Referring to FIGS. 4 and 5, in an illustrative embodiment the method 400 may include generating a digital output representing the output of the first signal conditioning circuit and/or the output of the second signal conditioning circuit at block 502

In this embodiment, the digital output may be a digital message including a first measurement based on the output of the first signal conditioning circuit and including a second measurement based on the output of the second signal conditioning circuit, for example.

The method 400 may also include providing an application specific integrated circuit (ASIC) package coupled to the first pressure transducer element, wherein the ASIC package includes the first signal conditioning circuit, the second signal conditioning circuit and the digital circuitry at block 504.

Figure 6:
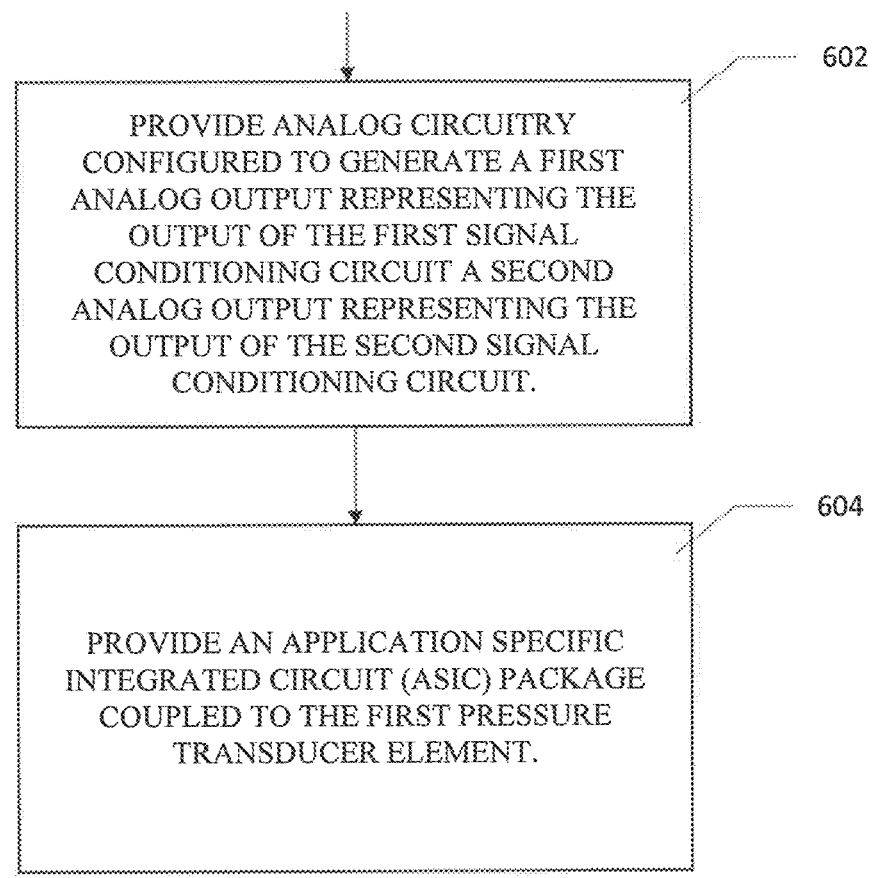
FIG. 6 is a process flow diagram illustrating a method for providing a pressure measurement according to an aspect of the present disclosure.

Referring to FIGS. 4 and 6, in another illustrative embodiment, the method 400 may include providing analog circuitry configured to generate a first analog output representing the output of the first signal conditioning circuit and a second analog output representing the output of the second signal conditioning circuit at block 602.

The method 400 may also include providing an application specific integrated circuit (ASIC) package coupled to the first pressure transducer element at block 604, wherein the ASIC package includes the first signal conditioning circuit, the second signal conditioning circuit and the analog circuitry, for example.

Figure 7:
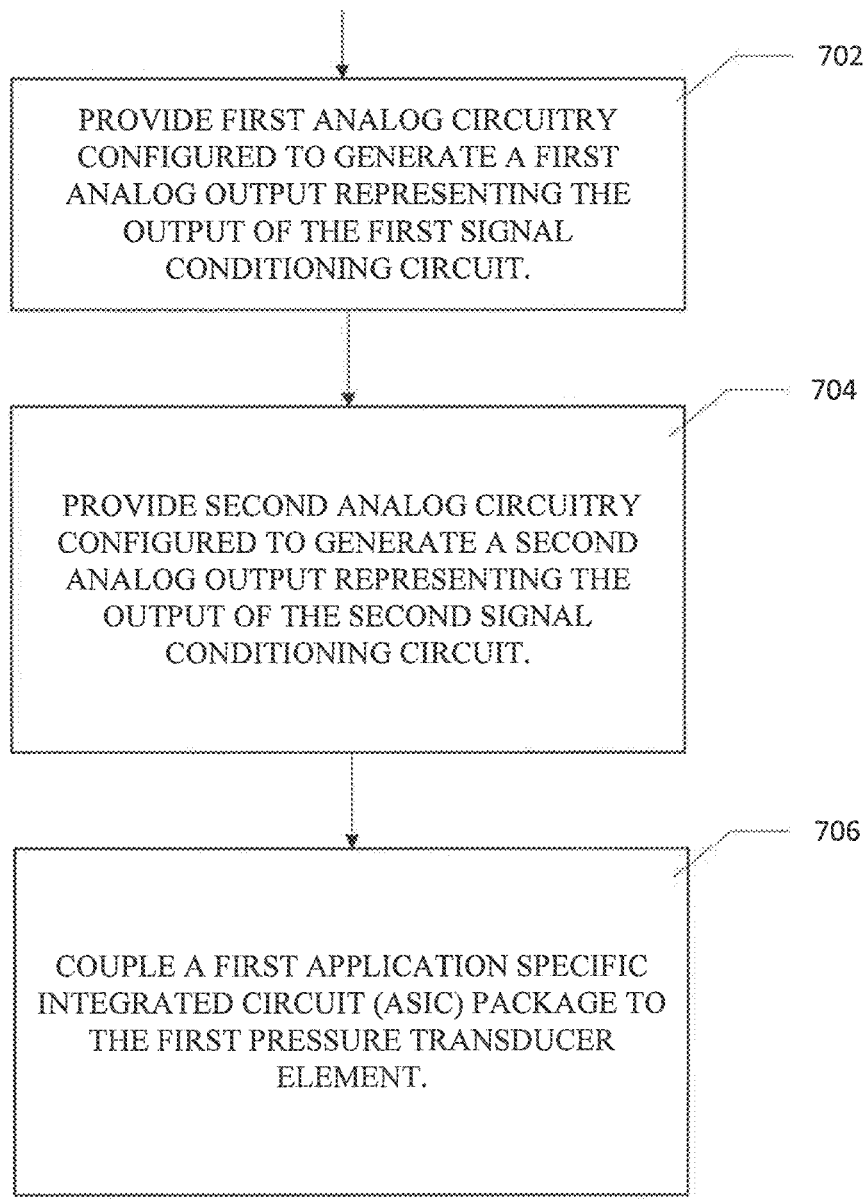
FIG. 7 is a process flow diagram illustrating a method for providing a pressure measurement according to an aspect of the present disclosure.

Referring to FIGS. 4 and 7, the method 400 may include providing first analog circuitry configured to generate a first analog output representing the output of the first signal conditioning circuit at block 702, and providing second analog circuitry configured to generate a second analog output representing the output of the second signal conditioning circuit at block 704.

At block 706, the method 400 may include coupling a first application specific integrated circuit (ASIC) package to the first pressure transducer element, wherein the first ASIC package includes the first signal conditioning circuit and the first analog circuitry, and coupling a second ASIC package to the first pressure transducer element, wherein the second ASIC package includes the second signal conditioning circuit and the second analog circuitry.

Another aspect of the present disclosure includes a dual range sensor apparatus. The dual range sensor apparatus includes a first sensor element including a first output path, a first signal conditioning circuit including a first input path coupled to the first output path of the first sensor element and a second signal conditioning circuit including a second input path coupled to the first output path of the first sensor element. The first signal conditioning circuit is configured based on a first range of a parameter sensed by the first sensor element, and wherein the second signal conditioning circuit is configured based on a second range of the parameter sensed by the first sensor element. According to an aspect of the present disclosure, the first sensor element may be one of a number of sensor types including a pressure sensor element, a temperature sensor element, a strain sensor element, a light sensor element, or an electromagnetic field sensor element, for example.

The foregoing description of embodiments is intended to provide illustration and description but is not intended to be exhaustive or to limit the invention to the precise form disclosed. Modifications and variations are possible in light of the above teachings or may be acquired from practice of the invention Although aspects of the present disclosure are described herein with respect to pressure sensing implementations, it should be understood that the disclosed apparatus may include various other types of sensor elements and transducers, rather than a pressure sensor element, for example. For example, alternative embodiments of the disclosed sensor device may include a temperature sense element, a light sense element, a strain sense element, or an electromagnetic field sense element in place of the pressure sensor element shown in FIGS. 1-3.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A pressure sensor apparatus, comprising:
a first pressure transducer element including a first output path;
a first signal conditioning circuit including a first input path coupled to the first output path of the first pressure transducer element;
a second signal conditioning circuit including a second input path coupled to the first output path of the first pressure transducer element; and
wherein the first signal conditioning circuit is configured based on a first pressure range, and wherein the second signal conditioning circuit is configured based on a second pressure range;
wherein an output of the first signal conditioning circuit represents pressure measured by the first pressure transducer element in the first pressure range;
wherein an output of the second signal conditioning circuit represents pressure measured by the first pressure transducer element in the second pressure range; and
digital circuitry configured to generate a digital output representing the output of the first signal conditioning circuit and/or the output of the second signal conditioning circuit.

2. The apparatus of claim 1, wherein the digital output comprises a message including a first measurement based on the output of the first signal conditioning circuit and including a second measurement based on the output of the second signal conditioning circuit.

3. The apparatus of claim 1, comprising an application specific integrated circuit (ASIC) package coupled to the first pressure transducer element, wherein the ASIC package includes the first signal conditioning circuit, the second signal conditioning circuit and the digital circuitry.

4. A method of providing a pressure measurement, comprising:
providing a first pressure transducer element including a first output path;
coupling a first signal conditioning circuit including a first input path to the first output path of the first pressure transducer element; and
coupling a second signal conditioning circuit including a second input path to the first output path of the first pressure transducer element;
wherein the first signal conditioning circuit is configured based on a first pressure range, and wherein the second signal conditioning circuit is configured based on a second pressure range;
providing an output of the first signal conditioning circuit representing pressure measured by the first pressure transducer element in the first pressure range;
providing an output of the second signal conditioning circuit representing pressure measured by the first pressure transducer element in the second pressure range; and
generating a digital output representing the output of the first signal conditioning circuit and/or the output of the second signal conditioning circuit.

5. The method of claim 4, wherein the digital output comprises a message including a first measurement based on the output of the first signal conditioning circuit and including a second measurement based on the output of the second signal conditioning circuit.

6. The method of claim 4, comprising providing an application specific integrated circuit (ASIC) package coupled to the first pressure transducer element, wherein the ASIC package includes the first signal conditioning circuit and the second signal conditioning circuit.

7. A dual range sensor apparatus, comprising
a first sensor element including a first output path;
a first signal conditioning circuit including a first input path coupled to the first output path of the first sensor element; and
a second signal conditioning circuit including a second input path coupled to the first output path of the first sensor element;
wherein the first signal conditioning circuit is configured based on a first range of a parameter sensed by the first sensor element, and wherein the second signal conditioning circuit is configured based on a second range of the parameter sensed by the first sensor element;
wherein the first sensor element is in the group consisting of:
a temperature sensor element, a light sensor element, and an electromagnetic field sensor element.

* * * * *